United States Patent
Murdock, IV et al.

(10) Patent No.: US 10,810,215 B2
(45) Date of Patent: Oct. 20, 2020

(54) SUPPORTING EVIDENCE RETRIEVAL FOR COMPLEX ANSWERS

(71) Applicant: INTERNATIONAL BUSINESS MACHINES CORPORATION, Armonk, NY (US)

(72) Inventors: James William Murdock, IV, Amawalk, NY (US); Eun Ha, Armonk, NY (US); Chung-Wei Hang, Armonk, NY (US); Kazi Hasan, Armonk, NY (US); Nisarga Markandaiah, Armonk, NY (US); Christopher Munjal Nolan, Acton, MA (US); Lin Pan, Armonk, NY (US); Sai Prathyusha Peddi, Cary, NC (US); Mary Diane Swift, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 15/844,289

(22) Filed: Dec. 15, 2017

(65) Prior Publication Data
US 2019/0188271 A1    Jun. 20, 2019

(51) Int. Cl.
*G06F 7/02*      (2006.01)
*G06F 16/00*     (2019.01)
(Continued)

(52) U.S. Cl.
CPC .. *G06F 16/24578* (2019.01); *G06F 16/24575* (2019.01); *G06F 16/3329* (2019.01); *G06F 16/3344* (2019.01); *G06F 40/30* (2020.01)

(58) Field of Classification Search
CPC ........ G06F 16/24575; G06F 16/24578; G06F 16/3344; G06F 16/3329; G06F 17/2785;
(Continued)

(56) References Cited

U.S. PATENT DOCUMENTS 6,654,764 B2    11/2003   Kelkar et al.
7,865,375 B2     1/2011   Lancaster et al.
(Continued)

FOREIGN PATENT DOCUMENTS

GB    2374690    10/2002

OTHER PUBLICATIONS

Peng, H. et al., "News Citation Recommendation with Implicit and Explicit Semantics," Proceedings of the 54th Annual Meeting of the Association for Computational Linguistics, pp. 388-398, Berlin, Germany, Aug. 7-12, 2016.
(Continued)

*Primary Examiner* — Bruce M Moser
(74) *Attorney, Agent, or Firm* — Michael Best & Friedrich LLP

(57) ABSTRACT

Systems and methods for generating answers to questions. One method includes receiving a question having question terms; identifying candidate answers to the question having answer terms; searching data sources to determine passages including either a question term or an answer term in the candidate answer; scoring the passages for candidate answers using a scoring mechanism, the scoring mechanism computing a first degree of relevance of the passage to the question terms, computing a second degree of relevance of the passage to the answer terms of one of the candidate answers, and determining a score for the passage by combining the first degree of relevance and the second degree of relevance; ranking candidate answers to the question based on the scores associated with the scoring each of the passages for each of the candidate answers; and providing an answer to the question based on ranking of the candidate answers.

20 Claims, 7 Drawing Sheets

(51) Int. Cl.
*G06F 16/2457* (2019.01)
*G06F 40/30* (2020.01)
*G06F 16/332* (2019.01)
*G06F 16/33* (2019.01)

(58) Field of Classification Search
CPC ........ G06F 17/278; G06F 17/28; G06F 40/30;
G06F 40/295; G06F 40/40; G06N 5/043
See application file for complete search history.

(56) References Cited

U.S. PATENT DOCUMENTS

| | | | | |
|---|---|---|---|---|
| 10,616,915 | B2* | 4/2020 | Lyu | .................... H04W 72/1284 |
| 2005/0010566 | A1 | 1/2005 | Cushing et al. | |
| 2006/0053000 | A1* | 3/2006 | Moldovan | ............. G06F 16/243 |
| | | | | 704/9 |
| 2006/0282414 | A1* | 12/2006 | Sugihara | ............. G06F 16/3329 |
| 2014/0006012 | A1* | 1/2014 | Zhou | .................... G06F 16/3344 |
| | | | | 704/9 |
| 2015/0039536 | A1* | 2/2015 | Cook | .................. G06F 16/9535 |
| | | | | 706/11 |
| 2016/0125013 | A1* | 5/2016 | Barborak | .......... G06F 16/24578 |
| | | | | 707/748 |
| 2017/0242915 | A1* | 8/2017 | Torisawa | ................. G06F 16/00 |

OTHER PUBLICATIONS

Wang, L. et al., "FastHybrid: A Hybrid Model for Efficient Answer Selection," In Proceedings of the 26th International Conference on Computational Linguistics: Technical Papers (COLING '16), pp. 2378-2388 Osaka, Japan, Dec. 11-17, 2016, Retrieved from Internet using: https://aclweb.org/anthology/C/C16/C16-1224.pdf.

Singh et al., "Words are not Equal: Graded Weighting Model for building Composite Document Vectors," arXiv:1512.03549, Dec. 2015, 10 pages.

Bhatia, S. et al., "Automatic Labelling of Topics with Neural Embeddings," Proceedings of the 26th International Conference on Computational Linguistics (COLING 2016), pp. 953-963, Osaka, Japan, Dec. 11-17, 2016.

Blei, D. et al., "Latent Dirichlet allocation," Journal of Machine Learning Research, 3 (2003) 993-1022.

Blei, D. et al., "Hierarchical topic models and the nested chinese restaurant process," 2003, In Proceedings of the 16th International Conference on Neural Information Processing Systems (NIPS'03), S. Thrun, L. K. Saul, and B. Schölkopf (Eds.). MIT Press, Cambridge, MA, USA, 17-24.

Papineni, K. et al., "BLEU: a method for automatic evaluation of machine translation," Proceedings of the 40th Annual Meeting of the Association for Computational Linguistics (ACL), Philadelphia, Jul. 2002, pp. 311-318.

Lin, "Rouge: A package for automatic evaluation of summaries," In Workshop of Text summarization branches out, 2004.

Bendersky, M. et al., "Effective query formulation with multiple information sources," 2012, Proceedings of the fifth ACM international conference on Web search and data mining, 443-452.

Paik, J. et al., "A Fixed-Point Method for Weighting Terms in Verbose Informational Queries," CIKM'14, Nov. 3-7, 2014, Shanghai, China, 10 pages.

Hsu, F. et al., "Comparing Rank and Score Combination Methods for Data Fusion in Information Retrieval," Information Retrieval (2005) 8: 449. doi:10.1007/s10791-005-6994-4.

Agarwal, A. et al., "Multi-dimensional feature merger for Question Answering," Proceedings of COLING 2012: Technical Papers, pp. 1-16, COLING 2012, Mumbai, Dec. 2012.

Sakakibara, H. et al., "The application of robustness analysis to the conflict with incomplete information," IEEE Transactions on Systems, Man, and Cybernetics, Part C (Applications and Reviews) 32, No. 1 (2002): 14-23. Retrieved from Internet using:https://repository.kulib.kyoto-u.ac.jp/dspace/bitstream/2433/40009/1/IEEE_TSMC_32_14.pdf.

Das, G. et al., "Ordering the attributes of query results," In Proceedings of the 2006 ACM SIGMOD international conference on Management of data, pp. 395-406. ACM, 2006. Retrieved from Internet using:https://pdfs.semanticscholar.org/079b/8a8c34644414ce4909c26f3f9a4831032186.pdf.

Murdock, W. et al., "Typing candidate answers using type coercion," IBM Journal of Research and Development 56, No. 3.4 (2012): 7-1. Retrieved from Internet using:https://pdfs.semanticscholar.org/765d/0956e46846a33a1062749daede11ba71680f.pdf.

* cited by examiner

SUPPORTING EVIDENCE RETRIEVAL FOR COMPLEX ANSWERS

FIELD

Embodiments described herein relate to systems and methods for information retrieval. More specifically, embodiments described herein relate to processing query results of retrieved evidence.

SUMMARY

One of the methods for scoring answers to questions includes searching for evidence in passages containing those answers and scoring such evidence. This method works well when answers are single concrete entities that generally have one word (for example, a name) or phrase with a small number of variants. For example, given the question "What is the capital of New York?" and the answer "Albany" one can perform support-evidence retrieval for passages that contain the term "Albany" and that support this answer to the question and them compute a cumulative score for how much the passages answer the question. However, the above mentioned method may not be as applicable to questions associated with longer, more complex answers that can be expressed in many different ways. For example, given the question "Why is gold expensive" and the candidate answer "because it is rate and beautiful and very useful in making jewelry," it is not realistic to expect a corpus of data to contain many (if any) documents that exactly contain the complete answer as provided above.

To solve these and other problems, embodiments described herein provide systems and methods for generating answers to questions. In the systems and methods provided herein the terms in the answer are set as optional so that the supporting-evidence search can find passages that may only partially contain the answer being scored. Also, passage scorers are used for determining not only the degree to which the passage answers the question but also the degree to which the passages refers to the candidate answers. Thus, the systems and methods described herein provide an improved question answer (QA) system that is capable of generating supporting evidence for complex answers to questions more efficiently and accurately as compared to previous designs and techniques.

For example, one embodiment provides a system for generating answers to questions. The system comprises an electronic processor configured to receive a question having a plurality of question terms and identify a plurality of candidate answers to the question, wherein each of the plurality of candidate answers includes a plurality of answer terms. The electronic processor is further configured to, for each of the plurality of candidate answers, search a plurality of data sources to determine supporting evidence passages including at least one of the one or more of the plurality of question terms, and one or more of the plurality of the answer terms included in the candidate answer. The electronic processor is also configured to score each of the supporting evidence passages for each of the plurality of candidate answers using a scoring mechanism. The scoring mechanism includes computing a first degree of relevance of the supporting evidence passage to the plurality of question terms, computing a second degree of relevance of the supporting evidence passage to the plurality of answer terms of one of the plurality of candidate answers. The scoring mechanism also includes determining a score for the supporting evidence passage by combining the first degree of relevance and the second degree of relevance. The electronic processor is also configured to rank the plurality of candidate answers to the question based on the scores associated with the scoring each of the supporting evidence passages for each of the plurality of candidate answers, and provide an answer to the question based on ranking of the plurality of candidate answers.

Another embodiment provides a method for generating answers to questions. The method includes receiving a question having a plurality of question terms, identifying a plurality of candidate answers to the question, wherein the each of the plurality of candidate answers includes a plurality of answer terms. The method also includes, for each of the plurality of candidate answers, searching a plurality of data sources to determine supporting evidence passages including at least one of the one or more of the plurality of question terms, and one or more of the plurality of the answer terms included in the candidate answer. The method further includes scoring each of the supporting evidence passages for each of the plurality of candidate answers using a scoring mechanism, the scoring mechanism computing a first degree of relevance of the supporting evidence passage to the plurality of question terms, computing a second degree of relevance of the supporting evidence passage to the plurality of answer terms of one of the plurality of candidate answers, and determining a score for the supporting evidence passage by combining the first degree of relevance and the second degree of relevance. The method also includes ranking the plurality of candidate answers to the question based on the scores associated with the scoring each of the supporting evidence passages for each of the plurality of candidate answers, and providing an answer to the question based on ranking of the plurality of candidate answers.

Another embodiment provides a non-transitory, computer-readable medium storing instructions that, when executed by an electronic processor, perform a set of functions. The set of functions includes receiving a question having a plurality of question terms; identifying a plurality of candidate answers to the question, wherein each of the plurality of candidate answers includes a plurality of answer terms; for each of the plurality of candidate answers, searching a plurality of data sources to determine supporting evidence passages including at least one of the one or more of the plurality of question terms, and one or more of the plurality of the answer terms included in the candidate answer; scoring each of the supporting evidence passages for each of the plurality of candidate answers using a scoring mechanism, the scoring mechanism computing a first degree of relevance of the supporting evidence passage to the plurality of question terms, computing a second degree of relevance of the supporting evidence passage to the plurality of answer terms of one of the plurality of candidate answers, and determining a score for the supporting evidence passage by combining the first degree of relevance and the second degree of relevance; ranking the plurality of candidate answers to the question based on the scores associated with the scoring each of the supporting evidence passages for each of the plurality of candidate answers; and providing an answer to the question based on ranking of the plurality of candidate answers.

Other aspects of the invention will become apparent by consideration of the detailed description and accompanying drawings.

DETAILED DESCRIPTION

Figure 1:
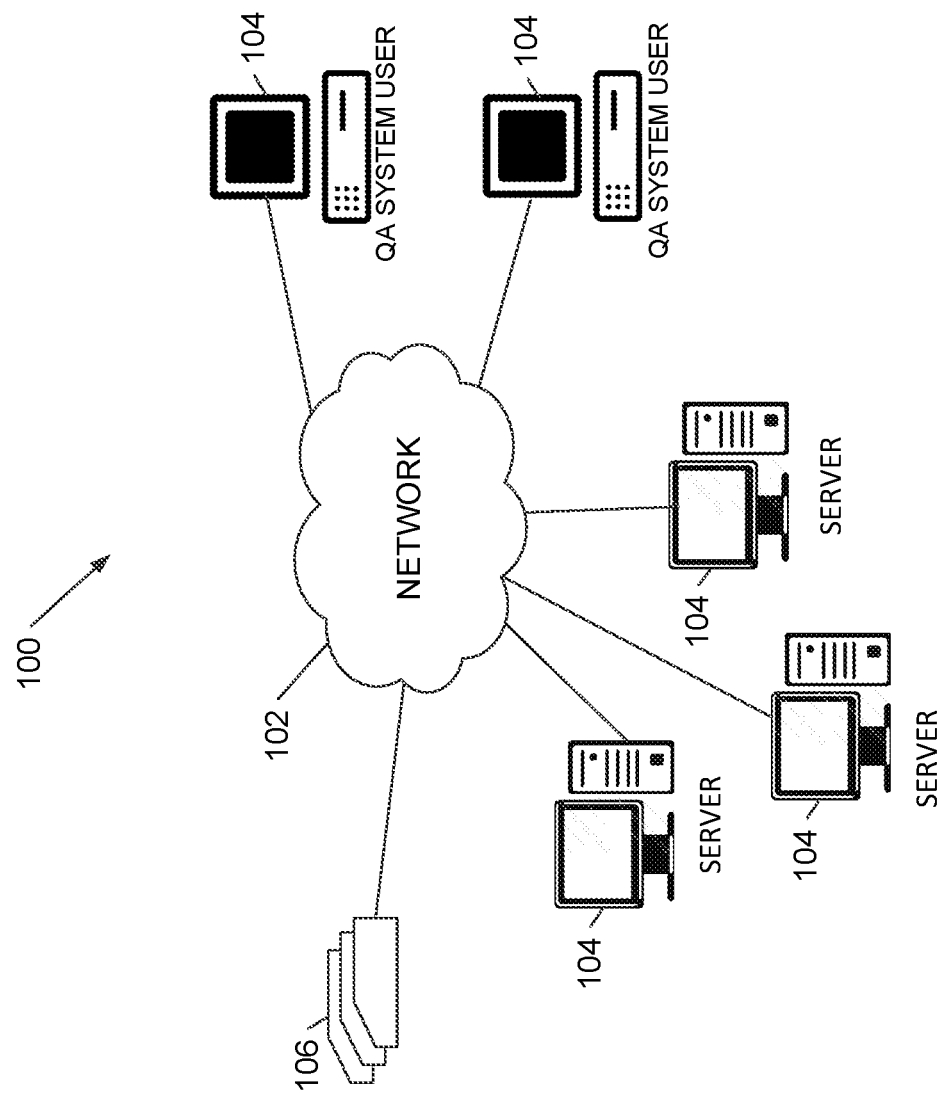
FIG. 1 illustrates a schematic diagram of a question answering (QA) system in accordance with some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
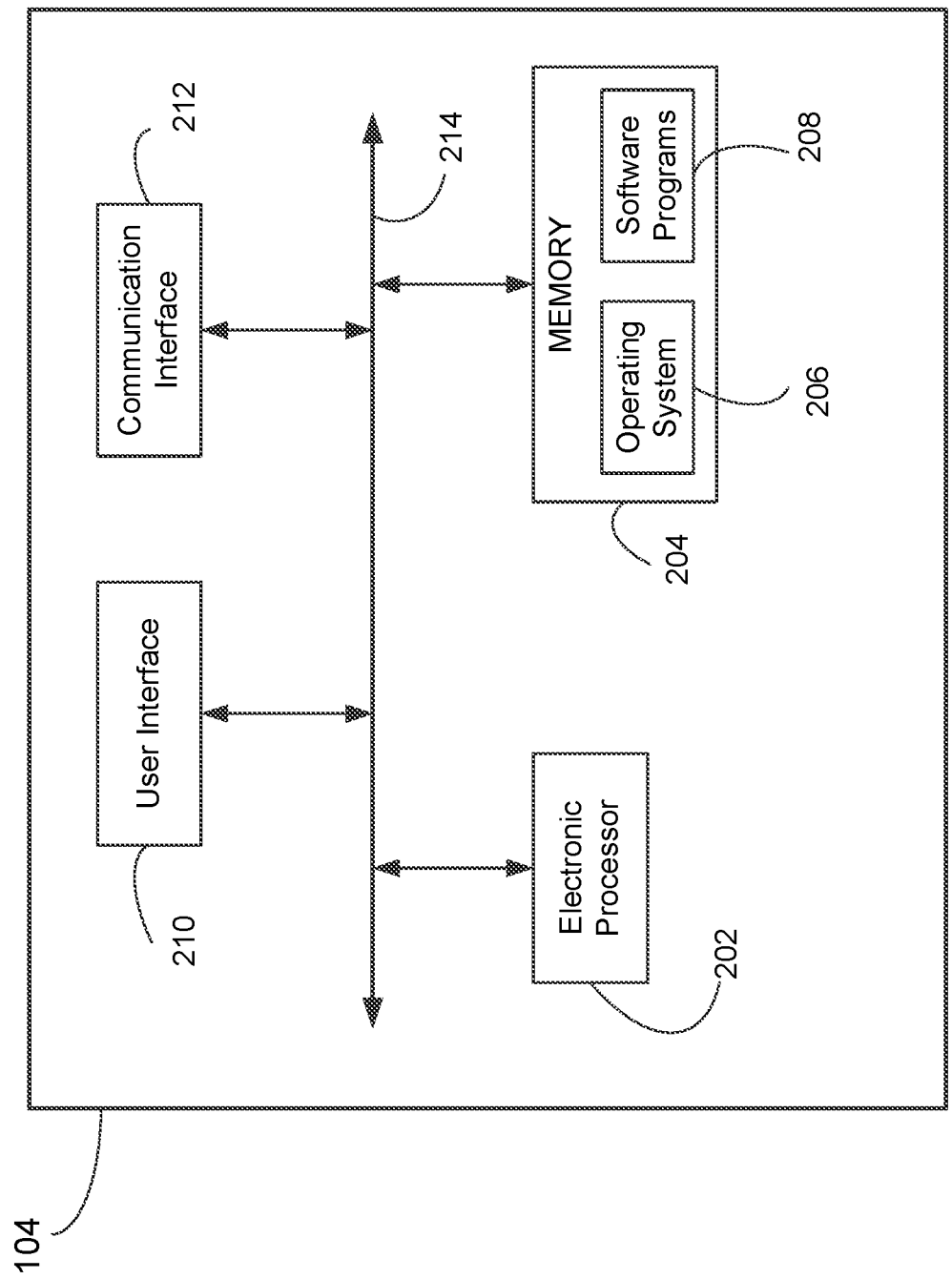
FIG. 2 is a block diagram of a computing device included in the QA system of FIG. 1 in accordance with some embodiments.

As an overview, a question answering system (QA) is an artificial intelligence application executed on data processing hardware (as shown in FIG. 2) that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area (e.g., financial domain, medical domain, legal domain, etc.) where the body of knowledge (knowledgebase) can be organized in a variety of configurations, such as but not limited to a structured repository of domain-specific information, such as ontologies, or unstructured data related to the domain, or a collection of natural language documents about the domain.

Content users input questions to the QA system, and the QA system answers the input questions using the content in the corpus of data by evaluating documents, sections of documents, portions of data in the corpus, or the like. During evaluation of a given section of a document for sematic content, a variety of conventions to query such document from the QA system may be used (for example, sending the query to the QA system as a well-formed question which are then interpreted by the QA system and a response is provided containing one or more answers to the question). Semantic content is content based on the relation between signifiers, such as words, phrases, signs, and symbols, and what they stand for, their denotation, or connotation. In other words, semantic content is content that interprets an expression, such as using natural language processing.

For example, as described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking for the corpus of data for portions of the corpus of data that have some potential for containing a valuable response to the input questions. The QA system then performs deep analysis of the language of the input question and the language used in each of the portions of the corpus of data found during the applications of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portions of the corpus of data and evaluate its veracity.

The scores obtained from the various reasoning algorithms indicate the extent to which the potential response is inferred by the input question based on the specific area of focus of that reasoning algorithm. In some embodiments, each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information, analyzing it, and then generating answer results based on the analysis of this data. Accessing information from a corpus of data typically includes: a database query that answers questions about what is in a collection of structured records, and a search that delivers a collection of documents links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus data, and selecting answers to questions from a pool of potential answers, i.e. candidate answers. In some embodiments, the QA system may include the IBM Watson™ QA system available from International Business Machines Corporation of Armonk, N.Y. configured to perform the functionality described herein. As described above for QA systems in general, the IBM Watson™ QA system receives an input question and parses the input question to extract the major features of the question, which the system uses to formulate queries that are applied to the corpus of data. Based on the application of the queries to the corpus of data, the system generates a set of hypotheses, or candidate answers to the input question, by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The system may then weight the scores obtained from the various reasoning against a statistical model that summarizes a level of confidence regarding the evidence that the potential response, i.e., a candidate answer is inferred by the question. This process may be repeated for each of the candidate answers to generate ranked listing of candidate answers that may be presented to the user that submitted the input question or from which a final answer is selected and presented to the user. Additional information about the IBM Watson™ QA system is described in Yuan et al., "Watson and Healthcare," IBM developerWorks, 2011 and "The era of Cognitive Systems: An inside Look at IBM Watson and How it works" by Rob High, IBM Redbooks 2012.

FIG. 1 is a schematic diagram of a question answering (QA) system 100 in accordance with some embodiments. The QA system 100 includes one or more computing devices 104 and a corpus of electronic documents 106 via a network 102. The network 102 includes local network connections and remote connections in various embodiments, such that QA system 100 may operate in environments of any size, including local and global, e.g., the Internet.

FIG. 2 is a block diagram of a computing device 104 in which aspects of the illustrative embodiments are implemented. The computing device 104 can be a server or a client or user device as shown in FIG. 1, in which computer usable code or instructions implementing the processes for illustrative embodiments of the present invention are located. In some embodiments, the computing device 104 includes an electronic processor 202, a memory 204, a user interface 210, a communication interface 212, and a bus 214. As shown in FIG. 2, the memory 204 may include an operating system 206 and one or more software programs 208. The electronic processor 202 may include at least one processor or microprocessor that interprets and executes a set of instructions stored in the memory 204. The electronic processor 202 accesses and executes computer-readable instructions ("software") in the software programs 208 stored in the memory 204. The software may include firmware, one or more applications, program data, filters, rules, one or more program modules, and other executable instructions. For example, the software may include instructions and associated data for performing a set of functions, including the methods described herein. The memory 204 includes a non-transitory computer-readable medium, such as read-only memory ("ROM"), random access memory ("RAM") (e.g., dynamic RAM ("DRAM"), synchronous DRAM ("SDRAM"), and the like), electrically erasable programmable read-only memory ("EEPROM"), flash memory, a hard disk, a secure digital ("SD") card, other suitable memory devices, or a combination thereof. The memory 204 may have a distributed architecture, where various components are situated remotely from one another, but may be accessed by the electronic processor 202.

The user interface 210 may include one or more human-machine interfaces (HMIs), such as a touch-screen, a mouse, a keyboard, a computer screen, a microphone, and the like. The communication interface 212 provides the computing device 104 a communication gateway with an external network (for example, a wireless network, the interne, etc.). The communication interface 212 may include, for example, an Ethernet card or adapter or a wireless local area network (WLAN) card or adapter (for example, IEEE standard 802.11a/b/g/n). The communication interface 212 may include address, control, and/or data connections to enable appropriate communications on the external network.

The bus 214, or other component interconnection, may permit communication among the components of the computing device 104. The bus 214 may be, for example, one or more buses or other wired or wireless connections, as is known in the art. The bus 214 may have additional elements, which are omitted for simplicity, such as controllers, buffers (for example, caches), drivers, repeaters and receivers, or other similar components, to enable communications. The bus 214 may also include address, control, data connections, or a combination of the foregoing to enable appropriate communications among the aforementioned components.

Figure 3A:
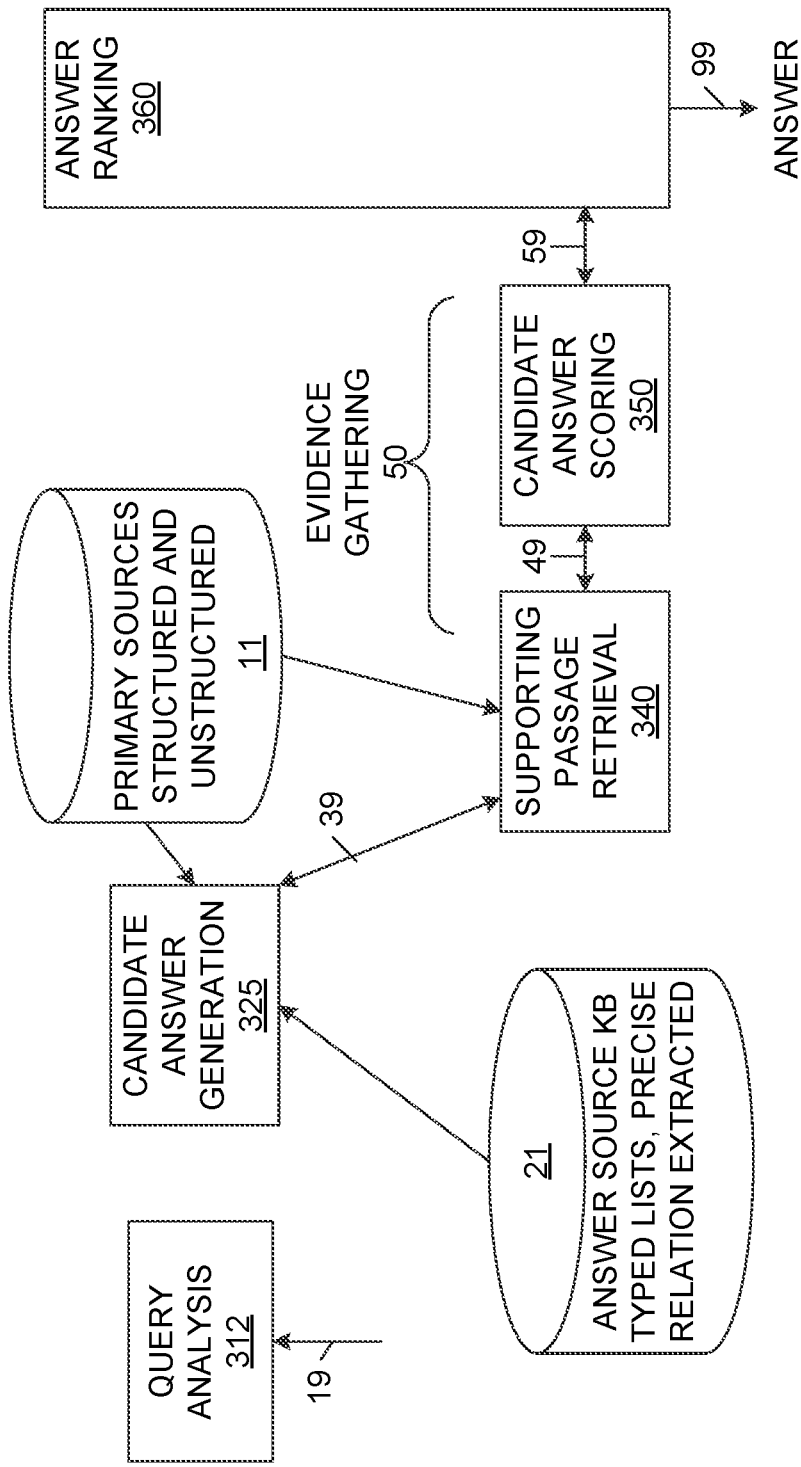
FIG. 3A is a system diagram of an architecture of the QA system of FIG. 1 in accordance with some embodiments.

FIG. 3A shows a system diagram providing an architecture 300 of the QA system 100 (the server 104) in accordance with some embodiments. The system shown in FIG. 3A includes an answer source knowledge base 21, primary sources of structured and unstructured data 11, query analysis module 312, a candidate answer generation module 325, an evidence gathering module (including a supporting passage retrieval module 340, a candidate answer processing and scoring module 350), and an answer ranking module 360. As shown in FIG. 3A, the architecture 300 includes a question analysis module 312 implementing functions for receiving and analyzing a user query or question. According to some embodiments, a "user" refers to a person or persons interacting with the system 100, and the term "user query" refers to a query (and its context) 19 posed by the user. However, as used herein, the term "user" may also refer to a user device 110 generating a query by electronic means and where the term "user query" refers to such an electronically generated query. A candidate answer generation module 325 generates a plurality of output data structures containing candidate answers based upon the analysis of retrieved data. The evidence gathering module 50 interfaces with the corpus of electronic documents 106 including the primary sources 11 and the knowledge base 21 for concurrently analyzing the evidence based on passages having candidate answers, and scoring each of the candidate answers as parallel processing operations.

As a result of implementing the functional modules of a candidate answer generation module 335 is configured to generate a query and run the query against the structured and unstructured primary data sources 11 in the (local and distributed) sources database or like memory storage device(s). This query may be run against the structured (KB), semi-structured (e.g., Wikipedia, IMDB databases, a collection of SEC filings in XBRL, etc.), or unstructured data (text repositories) to generate a candidate answer list 39.

In some embodiments, the architecture in FIG. 3A may use Common Analysis System (CAS) candidate answer structures and may implement supporting passage retrieval as will be described in greater detail herein below. This processing is depicted in FIG. 3A where the evidence gathering module 50 comprises the supporting passage retrieval module 340 and the candidate answer processing and scoring module 350 as separate processing modules for concurrently analyzing the passages and scoring each of the candidate answers as parallel processing operations. The answer source knowledge base 21 (part of the corpus of electronic documents 106 shown in FIG. 1) may comprise one or more databases of structured or semi-structured sources (pre-computed or otherwise) comprising collections of relations (e.g., typed lists). In an example implementation, the answer source knowledge base 21 may comprise a database stored in a memory storage system, e.g., a hard drive. An answer ranking module 360 provides functionality for ranking candidate answers and determining a response 99 that is returned to a user via a display interface (not shown) provided by a user device 110-112. The response may be an answer or an elaboration of a prior answer or request for clarification in response to a question—when a highly qualified answer to the question is not found.

As mentioned, embodiments described herein may use the Common Analysis System (CAS), a subsystem of the Unstructured Information Management Architecture (UIMA), that handles data exchanges between the various UIMA components, such as analysis engines and unstructured information management applications. CAS supports data modeling via a s type system independent of programming language, provides data access through a powerful indexing mechanism, and provides support for creating annotations on text data. CAS also allows for multiple definitions of the linkage between a document and its annotations, as is useful for the analysis of images, video, or other non-textual modalities.

In some embodiments, the Common Analysis Structure (CAS) type of data structure form is implemented as described in U.S. Pat. No. 7,139,752, the whole contents and disclosure of which is incorporated by reference as if fully set forth herein. As described herein, multiple parallel processing modules may be implemented to compute the scores of the candidate answers with the scores provided in CAS-type data structures 59 based on various criteria. For instance, the criteria may consider whether the answer satisfies similar lexical and semantic relations, how well the answer and the query align, how well the terms match and do the terms exist in similar order, etc. Thus, it is understood that multiple modules are used to process different candidate answers and thus, potentially provide many scores in accordance with the number of potential scoring modules.

As shown in FIG. 3A, the answer ranking module 360 receives a plurality of CAS type of data structures 59 output from the evidence gathering module 50 (which includes the supporting passage retrieval module 340 and the candidate answer processing and scoring module 350), and generates a score for each candidate answer.

Figure 3B:
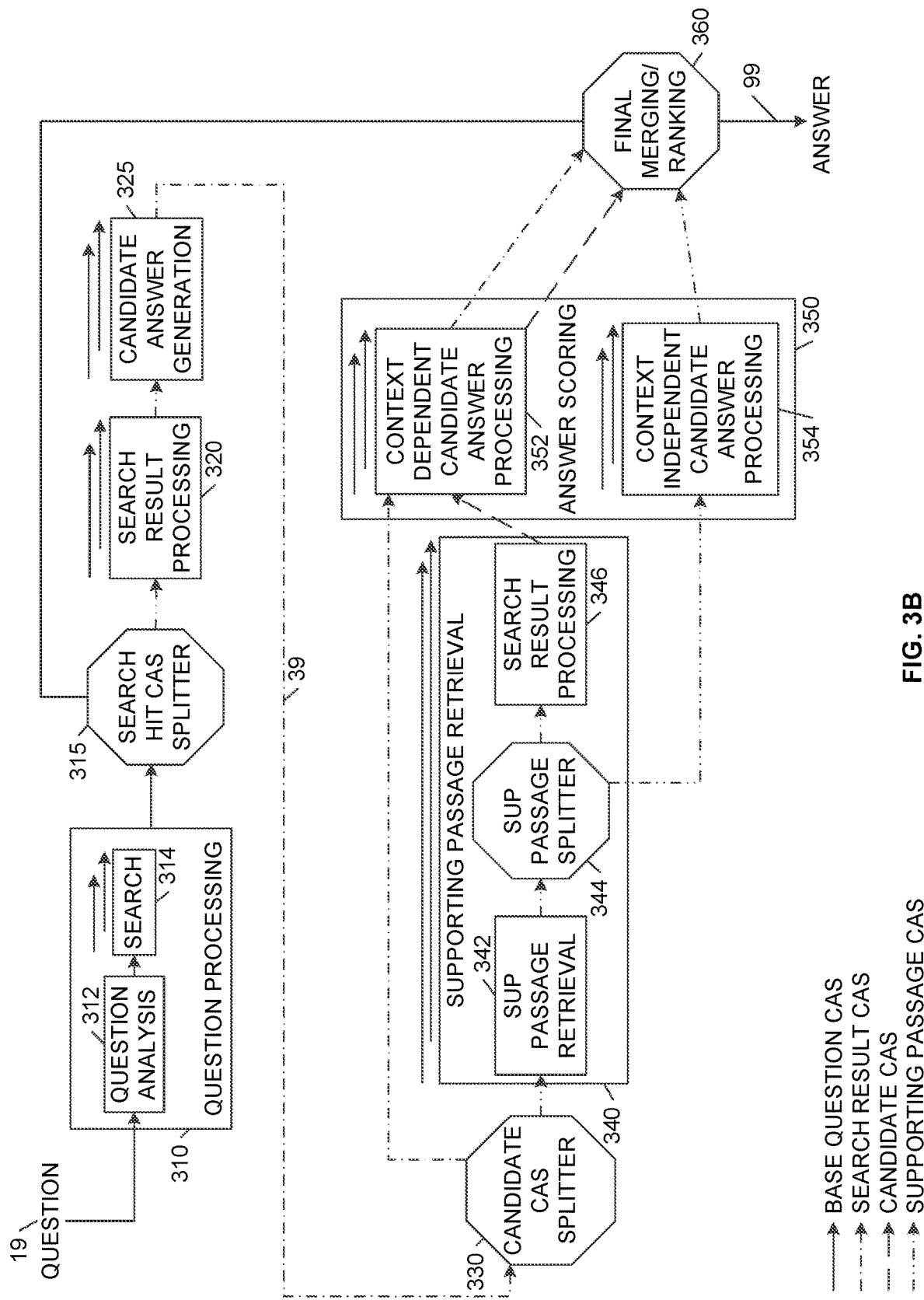
FIG. 3B is an operation diagram of the QA system represented in the system diagram of FIG. 3A in accordance with some embodiments.

FIG. 3B is an operation diagram 300 of the architecture shown in FIG. 3A in accordance with some embodiments. FIG. 3B also represents a data model defining the data structures supplied as input to, or produced as output by, the system components shown in FIG. 3A. As shown in FIG. 3B, a question processing module 310 receives an input that comprises a question 19 entered, for example, by a user via their web-based browser device An input question 19 may comprise a string such as "Why is gold expensive?". The question processing module 310 includes a question analysis module 312 and a search engine 314. The search engine 314 may include searching primary structured and unstructured sources, e.g. Google, a local copy of Wikipedia, or a database look-up. Search engine 314 has a query generator that generates an engine-specific query from the abstract query and formats it in the query syntax for the search engine and then processes the query and adds a search result hit-list to the CAS type of data structure. A search object contains the search engine query, an identifier for the search engine, and the search results. As represented in FIG. 3B, the data in the example CAS type data structure are output of the search results module of the question analysis processing module 310 and may be processed in parallel. A search hit CAS splitter 315 may be used to initiate a parallel search for candidate answers. For parallel operations, the search list (search result passages) are distributed by the CAS splitter 315 so that concurrent search result processing in module 320 are applied (work divided) to process each of the found search results and to perform candidate answer generation (in parallel) using the techniques described herein in the candidate answer generation module 325.

The data (in the example CAS type of data structure 39) output of the search results processing module 320 and the candidate answer generation module 325 is again processed in parallel by the candidate answer CAS splitter 330, which is used to parallelize the candidate answers for input to the supporting passage retrieval module 340. For each set of candidate answers, the CAS type of data structure may be split into separate CAS type of data structures such that each CAS type of data structure includes one or more candidate answers and is sent to evidence gathering module 50 (including the supporting passage retrieval module 340 and the answer processing and scoring module 350). In module 342, supporting passages are retrieved. Functionality is initiated after the candidate CAS splitter 330. Supporting passage records created by the supporting passage retrieval 342 may be split by the supporting passage splitter 344, and, since there are may be many of them, the splitter 344 may route the new CAS type data structures (with all information that was computed previously: context, query, candidate answer, supporting passage) to the answer processing and scoring module 350.

The results contain one or more CAS type of data structures containing (among other elements) the three items: a candidate answer, the question terms, and a supporting passage. Since thousands of such CAS type data structures can be generated per one question, these candidates may be scored in parallel. In an embodiment, the candidate scoring performed by the answer processing and scoring module 350 can be divided into two classes: a context dependent candidate answer processing module 352 (where the answer score depends on the passage content) and a context independent candidate answer processing module 354 (where the answer can be scored independently of the passage). For example, if the candidate answer is obtained from the document title, the score may not be dependent on the content of the passage, and, thus, are context independent. In contrast, other types of candidate answer scoring based on text alignment, grammatical relations, or lexical and semantic relations may involve a comparison between the query and the passage, and, thus, are context dependent. Since some of these methods may depend on the computation of grammatical and semantic relations in the passage, search results may be processed (in the search result processing module in the search result processing module 340) prior to context dependent candidate answer processing in module 352.

The results of an answer processing and scoring module 350 are saved using the CAS of data structure. During the answer ranking and processing 360, candidate answer features may be aggregated and merged and the final candidate answer scoring function may be applied to generate a final score that is provided to the user.

Figure 4:
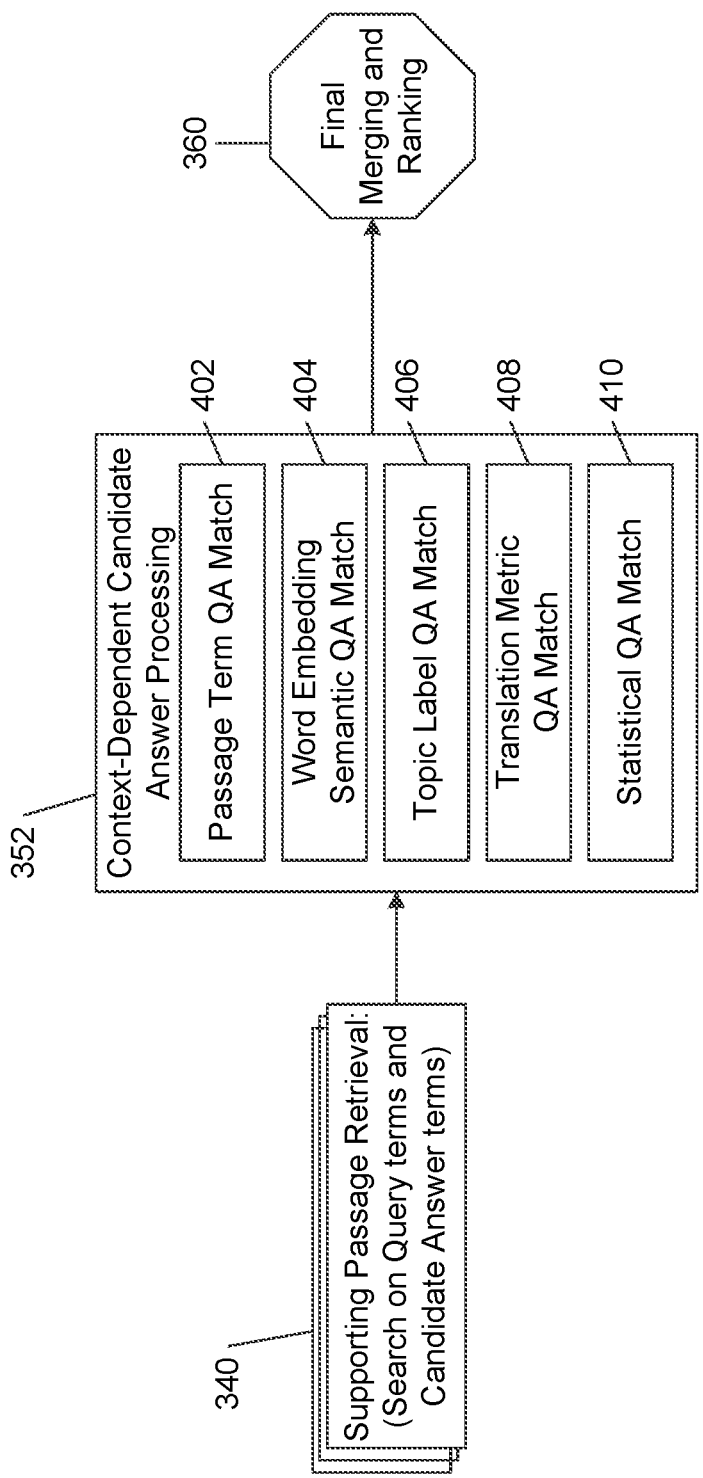
FIG. 4 is diagram of a content-dependent candidate answer processing module included in the QA system of FIG. 1.

FIG. 4 is a block diagram of the content-dependent candidate answer processing block 352 shown in FIG. 3B in accordance with some embodiments. As shown in FIG. 4, the content-dependent candidate answer processing module 352 receives the query terms and candidate answer terms from the search result processing module 340. The content-dependent candidate answer processing block 352 provides an output to the merging and ranking block 360. In some embodiments, the content-dependent candidate answer processing block 352 includes a passage term question and answer (QA) match module 402, a word embedding semantic QA match module 404, a topic label QA match module 406, a translation metric QA match module 408, and a statistical QA match module 410.

In some embodiments, the passage term QA match module 402 includes a scorer that computes a match score for the question terms in the question 19 and separately computes a match score for the candidate answer terms in the candidate answer 39 and then combines the two scores together (for example, by multiplying or taking the harmonic mean). In some embodiments, the passage term QA match module 402 is configured to discount the question terms that are far from the focus of the question 19. In some embodiments, the passage term QA match module 402 uses distributional semantics to judge the semantic similarity of the terms to assess the degree to which any pair of terms match.

In some embodiments, the word embedding semantic QA match module 404 includes a scorer that computes a semantic score of the passage for the question 19 and for the candidate answer 39 separately by representing each of the passage, question, and candidate answer as an aggregate term vector within a space of word embedding and computing a distance metric over the aggregate term vectors. In some embodiments, the two scores are combined (for example, by multiplying or taking the harmonic mean). In one example, the scorer uses cosine as the distance metric. In another example, the scorer uses word mover's distance (WMD) as a distance metric. In some embodiments, the scorer uses pooling and similarity computation as described in Section 3.3 of Lidan Wang, Ming Tan, and Chin-Yew Lin. "News Citation Recommendation with Implicit and Explicit Semantics." Association of Computational Linguistics (ACL) 2016, incorporated by reference as if set forth herein. In some embodiments, the scorer uses a term weighting scheme described in Section 3.2.1 of Dheeraj Mekala, Vivek Gupta, Harish Karnick, "Words are not Equal: Graded Weighting Model for building Composite Document Vectors," submitted to European Chapter of ACL 2017, incorporated by reference as set forth herein.

Figure 5:
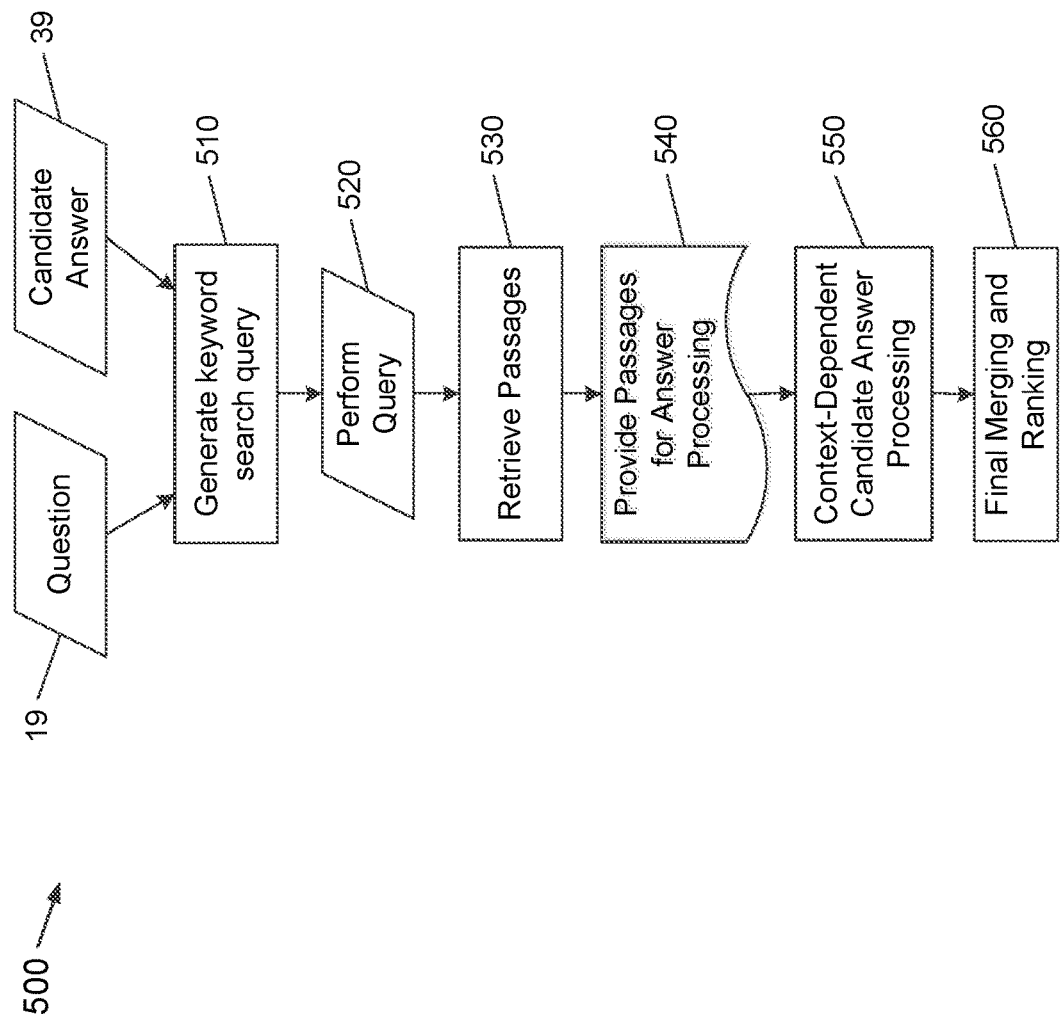
FIG. 5 is a flow chart of a method for processing a question and a candidate answer performed by the QA system of FIG. 1 in accordance with some embodiments.

FIG. 5 is a flow chart illustrating a method 500 for processing a question and a candidate answer in accordance with some embodiments. The method 500 may be performed by the QA system 100, such as the using the architecture illustrated in FIGS. 3A and 3B. As shown in FIG. 5, given a question 19 and a candidate answer 39 the method 500 includes generating a keyword search query (block 510). The output of block 510 is provided to block 520, which performs a query using the keyword search query. Based on the keyword query, the QA system is configured to retrieve passages (for as example, using supporting passage retrieval 340) from the corpus of electronic documents 106 (block 530). The output of block 530 is provided to block 540 that provides passages for answer processing in the answer processing and scoring module 350. The output of block 530 is provided to block 540 that performs context-dependent candidate answer processing. The output of block 540 is provided to block 550 that performs merging and ranking of the candidate answers.

Figure 6:
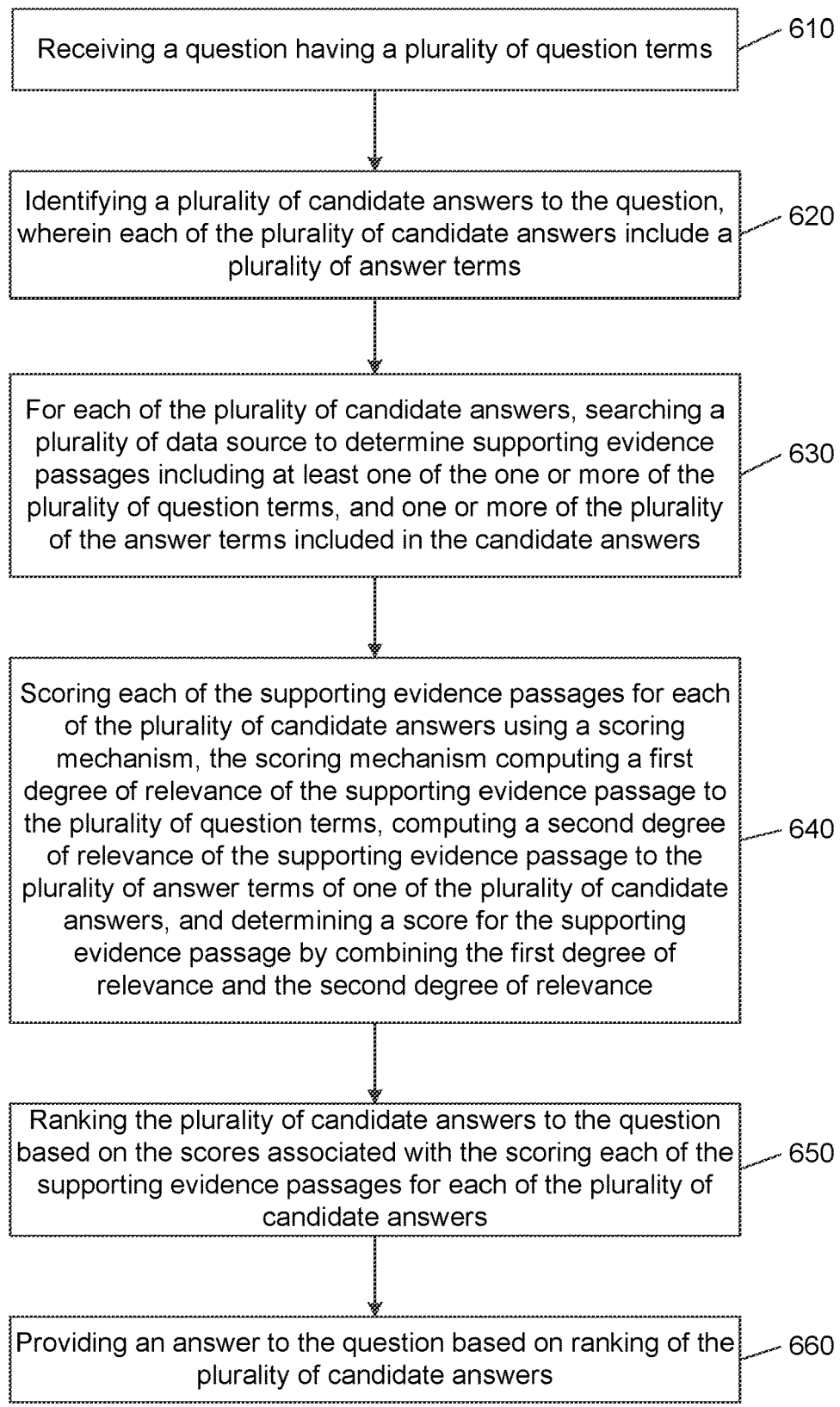
FIG. 6 is a flow chart illustrating further details of the method in FIG. 5 for generating answers to questions performed by the QA system in accordance with some embodiments.

FIG. 6 is a flow chart illustrating further details of the method 500 for generating answers to questions using context-dependent candidate answer processing, in accordance with some embodiments. At block 610, the method 500 includes receiving at the question processing module 310 a question 19 having a plurality of question terms. At block 620, the method 500 includes identifying a plurality of candidate answers to the question 19 using the candidate answer generation module 325, wherein each of the identified candidate answers includes several answer terms. For each of several candidate answers, the method 500 includes searching the corpus data 106 to determine supporting evidence passages including at least one of the one or more of the plurality of question terms, and one or more plurality of the answer terms included in the candidate answers (block 630). In some embodiments, the method 500 includes generating a keyword search query using the question and the candidate answer, wherein all of the terms in the question and the candidate answer are tagged as optional. In some embodiments, the plurality of evidence passages are retrieved from the corpus of data 106 using the keyword search query from the question processing module 310.

In some embodiments, the method 500 includes iterating through a set of passage scorers for each supporting evidence passage. The method 500 further includes scoring the extent to which each of the passage scorer determines that the supporting evidence passages answers the question in support of an alternate answer such that the alternate answer matches the candidate answer. In some embodiments, for each of the set of passage scorers, the scores of the supporting evidence passages are combined into one final score indicating that the passage scorer's conclusion of the alternate answer. In one example, the scores for the supporting evidence passages are combined by either summing the scores or taking the maximum value of the scores. In some embodiments, the method 500 includes computing a semantic score of a passage based on the question and another semantic score of the passage based on the candidate answer. In one example, the method 500 includes combining both the semantic scores using a cosine as a distance metric. In another example, the method 500 includes combining both the semantic scores using word mover's distance (WMD) as a distance metric. In some embodiments, the passage scorer uses at least one of a BLEU metric score or a Rouge metric score to compute the similarity of a set of passages to the question and the candidate answer. The BLEU metric score is described in Papineni et al. BLEU: a method for automatic evaluation of machine translation, ACL 2012 incorporated by reference as if set forth herein. The Rouge metric score is described in Chin-Yew Lin, Rouge: A package for automatic evaluation of summaries. In Workshop of Text summarization branches out, 2004 incorporated by reference as if set forth herein. In some embodiments, the passage scorers uses automatically labeled topics to relate the passages to the questions and candidate answers. Passages, questions, and answers are automatically labeled with topics that capture their main idea. The topic labels can be automatically generated with a variety of methods such as from word and documents embeddings computed from for example, Wikipedia and other corpus resources or obtained with Latent Dirichlet Alocation (LDA) techniques. The LDA techniques are described in David M. Blei, Michael I. Jordan, Thomas L. Griffiths, and Joshua B. Tenenbau, (2003), "Hierarchical topic models and the nested Chinese restaurant process," In Proceedings of the 16$^{th}$ International Conference on Neural Information Processing Systems (NIPS'03) and S. Thrun, L. K. Saul, and B. Schlolkopf (Eds.). MIT Press, Cambridge, Mass. USA, 17-24 2004 incorporated by reference as if set forth herein.

In some embodiments, the method 500 further includes computing a match score for a passage by evaluating the overlap of the topic terms (for example, looking for an exact match) in the passage with topic terms in the question and the candidate answer. Topic term overlap scores are computed for the question and the candidate answer separately, and they are combined for the final score (for example, by multiplying or taking the harmonic mean).

In some embodiments, the method 500 further includes computing the similarity between two short texts. The model is trained using pairs of questions and known correct answers to those questions. The model may be used to compute the similarity between the question and the supporting passages. The model may also be used to compute the similarity between the candidate answer and the supporting passage. The two similarity scores are then combined (for example, by multiplying or taking the harmonic mean).

In some embodiments, the method 500 further includes computing a match score each for the plurality of question terms and the plurality of answer terms and combining the match score obtained for each of the plurality of question terms and the plurality of answer terms. In some embodiments, combining the match scores includes multiplying the match scores for the plurality of question terms and the plurality of answer terms. In some embodiments, combining the match scores includes determining a harmonic mean of the match score for the plurality of question terms and the match score for the plurality of answer terms.

The method 500 further includes scoring each of the supporting evidence passages for each of the plurality of candidate answers using a scoring mechanism (block 640). In some embodiments, the scoring mechanism computes a first degree of relevance of the supporting evidence passage to the plurality of question terms and also computes a second degree of relevance of the supporting evidence passage to the plurality of answer terms of one of the plurality of candidate answers. In some embodiments, the method 500 includes determining the first degree of relevance and the second degree of relevance using one or more weightings selected from the group consisting of a lexical proximity of terms, a distributional semantics, and a statistical model. In some embodiments, the method 500 includes determining a score for the supporting evidence passage by combining the first degree of relevance and the second degree of relevance.

The method 500 also includes ranking the plurality of candidate answers to the question based on the scores associated with the scoring evidence passages for each of the plurality of candidate answers (block 650). At block 660, the method includes providing an answer to the question 19 based on ranking of the plurality of candidate answers. In some embodiments, the method 500 includes determining a match score for a passage by computing a weight for each question term and dividing a sum of weights of each question term found in the passage by a sum of weights of all the question terms.

The method 500 provided herein allows for determining an answer to a question using a QA system 100. As described above the QA system 100 receives the question 19 having several question terms and identifies candidate answers, each having several answer terms. The QA system 100 is configured to search the corpus of electronic documents 106 for supporting evidence passages that are relevant to one or more of the question terms and one or more of the answer terms. The QA system 100 is further configured to score the supporting evidence passages utilizing a scoring algorithm that combines a computation of the degree of relevance of the question term with a computation of the degree of relevance to the answer terms. The QA system 100 is further configured to score and rank the potential answers to the question, and provide an answer to the question based on the scoring and ranking performed in module 360.

Various features and advantages are set forth in the following claims.

What is claimed is:

1. A system for generating answers to questions, the system comprising:
an electronic processor configured to receive a question having a plurality of question terms;

identify a plurality of candidate answers to the question, wherein each of the plurality of candidate answers includes a plurality of answer terms;

for each of the plurality of candidate answers, search a plurality of data sources using a search query including at least one or more of the plurality of question terms and one or more of the plurality of the answer terms included in the candidate answer to determine supporting evidence passages including at least one of the one or more of the plurality of question terms, and one or more of the plurality of the answer terms included in the candidate answer;

score each of the supporting evidence passages for each of the plurality of candidate answers using a scoring mechanism, the scoring mechanism computing a first degree of relevance of the supporting evidence passage to the plurality of question terms, computing a second degree of relevance of the supporting evidence passage to the plurality of answer terms of one of the plurality of candidate answers, and determining a score for the supporting evidence passage by combining the first degree of relevance and the second degree of relevance;

rank the plurality of candidate answers to the question based on the scores associated with the scoring each of the supporting evidence passages for each of the plurality of candidate answers; and provide an answer to the question based on ranking of the plurality of candidate answers.

2. The system of claim 1, wherein one or more of the plurality of question terms and one or more of the plurality of the answer terms included in the candidate answer are tagged as optional.

3. The system of claim 2, wherein the electronic processor is further configured to retrieve the plurality of supporting evidence passages from a corpus of data using the search query.

4. The system of claim 3, wherein the electronic processor is further configured to iterate through a set of passage scorers for each of the supporting evidence passages, and score an extent to which each of the passage scorer determines that the supporting evidence passages answers the question in support of an alternate answer, wherein the alternate answer matches the candidate answer.

5. The system of claim 4, wherein the electronic processor is further configured to determine a match score for a passage by computing a weight for each question term and dividing a sum of weights of each question term found in the passage by a sum of weights of all the question terms.

6. The system of claim 4, wherein the electronic processor is further configured to for each of the set of passage scorers, combine the scores for the supporting evidence passages into one final score indicating that passage scorer's conclusion for the alternate answer.

7. The system of claim 6, wherein the electronic processor is further configured to combine the scores for the supporting evidence passages by at least one of summing the scores and taking a maximum value of the scores.

8. The system of claim 1, wherein the electronic processor is further configured to compute a first match score for the plurality of question terms, compute a second match score for the plurality of answer terms, and combine the first match score and the second match score.

9. The system of claim 8, wherein the electronic processor is further configured to combine the first match score and the second match score by multiplying the first match score and the second match score.

10. The system of claim 8, wherein the electronic processor is further configured to combine the first match score and the second match score by determining a harmonic mean of the first match score and the second match score.

11. The system of claim 4, wherein the electronic processor is further configured to compute a first semantic score of a passage, the first semantic score associated with the question;

compute a second semantic score of the passage, the second semantic score associated with the candidate answer; and combine the first semantic score and the second semantic score.

12. The system of claim 11, wherein the electronic processor is further configured to combine the first semantic score and the second semantic score using cosine as a distance metric.

13. The system of claim 11, wherein the electronic processor is further configured to combine the first semantic score and the second semantic score using word mover's distance (WMD) as a distance metric.

14. The system of claim 4, wherein the scorer uses at least one of a BLEU metric score or a Rouge metric score to compute a similarity of a set of passages to the question and the candidate answer.

15. A method of generating answers to questions, the method comprising:

receiving, with an electronic processor, a question having a plurality of question terms;

identifying, with the electronic processor, a plurality of candidate answers to the question, wherein each of the plurality of candidate answers includes a plurality of answer terms;

for each of the plurality of candidate answers, searching a plurality of data sources using a search query including at least one or more of the plurality of question terms and one or more of the plurality of the answer terms included in the candidate answer to determine supporting evidence passages including at least one of the one or more of the plurality of question terms, and one or more of the plurality of the answer terms included in the candidate answer;

scoring, with the electronic processor, each of the supporting evidence passages for each of the plurality of candidate answers using a scoring mechanism, the scoring mechanism computing a first degree of relevance of the supporting evidence passage to the plurality of question terms, computing a second degree of relevance of the supporting evidence passage to the plurality of answer terms of one of the plurality of candidate answers, and determining a score for the supporting evidence passage by combining the first degree of relevance and the second degree of relevance;

ranking, with the electronic processor, the plurality of candidate answers to the question based on the scores associated with the scoring each of the supporting evidence passages for each of the plurality of candidate answers; and providing an answer to the question based on ranking of the plurality of candidate answers.

16. The method of claim 15, wherein one or more of the plurality of question terms and one or more of the plurality of the answer terms included in the candidate answer are tagged as optional.

17. The method of claim 16, further comprising: determining the first degree of relevance and the second degree of relevance using one or more weightings selected from the group consisting of a lexical proximity of terms, a distributional semantics, and a statistical model.

18. The method of claim 17, further comprising: iterating through a set of passage scorers for each of the supporting evidence passages; and scoring the extent to which each of the passage scorer determines that the supporting evidence passages answers the question in support of an alternate answer, wherein the alternate answer matches the candidate answer.

19. The method of claim 15, further comprising: computing a first match score for the plurality of question terms;

computing a second match score for the plurality of answer terms; and combining the first match score and the second match score.

20. A non-transitory, computer-readable medium storing instructions that, when executed by an electronic processor, perform a set of functions, the set of functions comprising:

receiving a question having a plurality of question terms;

identifying a plurality of candidate answers to the question, wherein each of the plurality of candidate answers includes a plurality of answer terms;

for each of the plurality of candidate answers, searching a plurality of data sources using a search query including at least one or more of the plurality of question terms and one or more of the plurality of the answer terms included in the candidate answer to determine supporting evidence passages including at least one of the one or more of the plurality of question terms, and one or more of the plurality of the answer terms included in the candidate answer;

scoring each of the supporting evidence passages for each of the plurality of candidate answers using a scoring mechanism, the scoring mechanism computing a first degree of relevance of the supporting evidence passage to the plurality of question terms, computing a second degree of relevance of the supporting evidence passage to the plurality of answer terms of one of the plurality of candidate answers, and determining a score for the supporting evidence passage by combining the first degree of relevance and the second degree of relevance;

ranking the plurality of candidate answers to the question based on the scores associated with the scoring each of the supporting evidence passages for each of the plurality of candidate answers; and providing an answer to the question based on ranking of the plurality of candidate answers.

* * * * *